United States Patent
Yamaki

(10) Patent No.: US 6,884,380 B2
(45) Date of Patent: Apr. 26, 2005

(54) METHOD OF INJECTION MOLDING OF THERMOPLASTIC RESIN

(75) Inventor: Hiroshi Yamaki, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 217 days.

(21) Appl. No.: 10/049,598

(22) PCT Filed: Jun. 12, 2001

(86) PCT No.: PCT/JP01/04958
§ 371 (c)(1),
(2), (4) Date: Feb. 14, 2002

(87) PCT Pub. No.: WO01/92122
PCT Pub. Date: Dec. 6, 2001

(65) Prior Publication Data
US 2004/0222565 A1 Nov. 11, 2004

(30) Foreign Application Priority Data
Jun. 14, 2000 (JP) ................................ 2000-177820

(51) Int. Cl.$^7$ ............................................. B29C 45/46
(52) U.S. Cl. ......................... 264/328.17; 264/45.5; 264/50; 264/51
(58) Field of Search ..................... 264/328.17, 45.5, 264/50, 51, 500, 328.1, 321

(56) References Cited

U.S. PATENT DOCUMENTS

| 4,990,595 A | * | 2/1991 | Traechkner et al. | ........ 528/483 |
| 5,334,356 A | | 8/1994 | Baldwin et al. | |
| 5,700,407 A | * | 12/1997 | Branger | ........ 264/54 |
| 5,997,781 A | * | 12/1999 | Nishikawa et al. | ........ 264/45.1 |
| 6,146,577 A | * | 11/2000 | Yamaki et al. | ........ 264/500 |
| 6,277,896 B1 | * | 8/2001 | Roth et al. | ........ 521/51 |
| 6,337,039 B1 | * | 1/2002 | Yamaki et al. | ........ 264/1.33 |

FOREIGN PATENT DOCUMENTS

| EP | 0 826 477 A2 | 3/1998 |
| EP | 0 914 919 A1 | 5/1999 |
| JP | 5-318541 A | 12/1993 |
| JP | 2000-190349 A | 7/2000 |
| WO | 89/00918 A2 | 2/1989 |

OTHER PUBLICATIONS

Chiou et al., Journal of Applied Polymer Science, vol. 20, pp. 2633–2642 (1985).

* cited by examiner

Primary Examiner—Michael P. Colaianni
Assistant Examiner—Monica A. Fontaine
(74) Attorney, Agent, or Firm—Birch, Stewart, Kolasch & Birch, LLP

(57) ABSTRACT

The invention is to ensure that in injection molding a molten resin having carbon dioxide dissolved therein as a plasticizer, a sufficient amount of carbon dioxide to achieve satisfactory improvement in flowability is dissolved in the molten resin so that the flowability of the molten resin is significantly improved while enabling the production of a non-foamed molded article.

Specifically, in the invention, a molten resin having dissolved therein a sufficient amount of carbon dioxide to improve its flowability is filled into a mold cavity while allowing to foam at the flow front of the molten resin, and the resin in the mold cavity is then pressurized to at least a pressure at which it does not foam.

2 Claims, 5 Drawing Sheets

METHOD OF INJECTION MOLDING OF THERMOPLASTIC RESIN

This application is the national phase under 35 U.S.C. §371 of PCT International Application No. PCT/JP01/04598 which has an International filing date of Jun. 12, 2001, which designated the United States of America.

TECHNICAL FIELD

This invention relates to a method of injection molding of a thermoplastic resin, and more specifically, to a method of injection molding that provides ease in filling a mold cavity with a molten resin and which enables sections of a smaller wall thickness and a longer flow distance to be filled with a molten resin at a lower temperature or pressure.

BACKGROUND ART

The demand for smaller thickness and lighter weight is not limited to the housings of mobile electronic devices such as portable computers and cell phones and it has recently become intensive in the field of general electronic devices. In particular, the chassis and the internal mechanistic parts of a copying machine and the like are required to have not only high dimensional precision and various kinds of strength associated with handling but also reduction in thickness and weight. As a result, injection moldings are needed that desirably have unequal section thickness, i.e., the portions that do not require strength are made thin and lightweight whereas the portions that require strength are made thick, and which still have good dimensional precision. In other words, it is required to meet both requirements for strength and lightweight by providing a design in which the portions that require strength are reinforced with thick ribs whereas the portions that do not require strength are made as thin as possible. Under these circumstances, a molding method is needed by which even the sections that are thin-walled and have long flow distances can be adequately filled with a resin during molding.

In order to ensure that even the sections that are thin-walled and have long flow distances can be adequately filled with a resin, one may enhance the flowability of a molten resin. In injection molding of a thermoplastic resin, the flowability of a molten resin determines not only the ease in filling the mold cavity but also the probability that after filling the cavity, sufficient pressure is transmitted to its interior, particularly to the resin which forms the thin-walled portions at the end of resin flowing; hence, the flowability of a molten resin also affects the dimensional precision of moldings and is an important factor that determines the processability of resins.

One index of flowability is the viscosity of a molten resin. Thermoplastic resins have high melt viscosity and are poor in flowability as molding materials. Hence, in the case of thin-walled parts, incomplete resin filling often occurs.

In order to lower the viscosity of a molten resin and thereby improve the flowability, it is effective to increase the molding temperature; however, in the case of a resin for which the molding temperature is close to its decomposition temperature or a resin incorporating special additives such as less heat-stable flame retardants, the resin itself or the additives may undergo thermal decomposition and problems are likely to occur as exemplified by the decrease in the strength of moldings, the formation of foreign matter due to the deteriorated resin, the staining of the mold and discoloration. Yet another problem is delayed cooling of the resin in the mold which contributes to prolonging the molding cycle time.

The following methods are conventionally known to be capable of improving the flowability of molten resin without increasing the molding temperature.

(1) Reducing the molecular weight of the resin by lowering its average molecular weight or broadening the molecular weight distribution, particularly by increasing the low-molecular weight component.

(2) Introducing a comonomer into the molecule.

(3) Adding a low-molecular weight oily substance such as mineral oil or a plasticizer such as a higher aliphatic acid ester.

(4) Dissolving carbon dioxide which acts as a plasticizer.

To further describe the above method (4), as shown in J. Appl. Polym. Sci., Vol. 30, 2633 (1985) and many other references, it is known that carbon dioxide dissolved in a resin works as a plasticizer for the resin to lower its glass transition temperature. In addition, the official gazette of Japanese Patent Laid-Open No. 318541/1993 discloses two methods for producing non-foamed molded articles using thermoplastic resins having their flowability improved with gases; in one method, a thermoplastic resin incorporating a gas such as carbon dioxide in an amount of 10 to 90 vol % as calculated under normal temperature and pressure is injected into a mold cavity that has been forcibly evacuated by, for example, a pump and the mold cavity is held evacuated until dwelling so that molding can be performed with the gas from the thermoplastic resin being forced out of the mold cavity; in the other method, the thermoplastic incorporating the gas is injected into a partially opened mold as accompanied by breathing and then subjected to compression molding.

It is also known to produce foamed molded articles using molten resins having a gas such as carbon dioxide dissolved therein. For example, the specifications of WO 89/00918 and U.S. Pat. No. 5,334,356 disclose methods in which carbon dioxide used as a blowing agent is supplied into a molten resin as it flows part of the way through an extruder, thereby molding a fine and highly foamed microcellular foam.

However, the aforementioned method (1) lowers impact strength and chemical resistance although it increases flowability; the aforementioned method (2) lowers hot rigidity; and the aforementioned method (3) has problems such as the plasticizer lowering hot rigidity or being deposited on the mold to stain it during molding.

The aforementioned method (4) has the advantage of not causing the problems encountered in the above methods (1)–(3); however, since the gas incorporated in the molten resin also functions as a blowing agent, this method suffers the problem that the molded article tends to have a foam structure.

The basic principle of the method described in the official gazette of Japanese Patent Laid-Open No. 318541/1993 is that foaming is suppressed by causing the gas in the molten resin to be rapidly removed before the dwelling step starts. In this method described in the official gazette of Japanese Patent Laid-Open No. 318541/1993, the above-mentioned rapid breathing cannot be effected if more gas is incorporated in the molten resin and this sets considerable limit to the volume of the gas that can be preliminarily incorporated in the molten resin. Specifically, if carbon dioxide is used as gas in the method described in the official gazette of Japanese Patent Laid-Open No. 318541/1993, the amount of carbon dioxide that can be dissolved in the molten resin is as small as about 0.18 wt % at maximum and this is insufficient to achieve the satisfactory improvement in flowability.

Under these circumstances, the present inventors proposed in WO 98/52734 a new method of injection molding which used carbon dioxide as a plasticizer but it still suffered the problem of difficulty in achieving the satisfactory improvement in flowability.

The present invention has been accomplished in the light of the aforementioned problems in the prior art and has as an object ensuring that in injection molding a molten resin having carbon dioxide dissolved therein as a plasticizer, a sufficient amount of carbon dioxide to achieve satisfactory improvement in flowability is dissolved in the molten resin so that a molding can be obtained with significant improvement in the flowability of the molten resin.

DISCLOSURE OF THE INVENTION

As a result of the studies conducted in order to achieve the above object, the present inventors found the followings and accomplished the present invention.

The first finding is that carbon dioxide dissolved in a molten resin is dissipated into the atmosphere without deforming a molded article even if it remains in large amount in the molded article.

The second finding is that a molten resin having a large amount of carbon dioxide dissolved therein foams at its flow front (the advancing end of the molten resin flow within the mold) during injection and filling to release carbon dioxide into the mold cavity but the carbon dioxide within the mold cavity cavity is not highly probable to interfere with the molding process since it is absorbed again into the molten resin by increasing the pressure of the molten resin filled in the mold cavity to be higher than the pressure at which the molten resin foams.

The third finding is that by increasing the pressure of the molten resin filled in the mold cavity to be higher than the pressure at which said molten resin foams, internal foaming can be suppressed while the dissolved carbon dioxide is confined in the molten resin.

The fourth finding is that while the above foaming of the molten resin at the flow front leaves swirl marks on the surface of the molded article, no bubbles will remain at the pressure of the molten resin after filling of the mold cavity and that in the applications of moldings where the existence of swirl marks on the surface is not a big problem, the latitude in the choice of materials is considerably increased.

The present invention has been accomplished on the basis of the above findings and provides a method of injection molding of a thermoplastic resin, comprising:

filling a mold cavity with a molten resin, having at least 0.2 wt % of carbon dioxide dissolved therein to lower its melt viscosity, while allowing the molten resin to foam at the flow front thereof; and then pressurizing said resin to at least a pressure at which said resin does not foam.

Preferred embodiments of the invention include: using such a thermoplastic resin that, when carbon dioxide is supplied from a plasticizing cylinder of an injection molding machine to be dissolved in the molten resin, the amount of carbon dioxide dissolved in the molten resin at the molding temperature is not more than 0.3 wt %/MPa with respect to the pressure of the supplied carbon dioxide; setting the amount of carbon dioxide dissolved in the molten resin to not more than 10 wt %.

Figure 1:
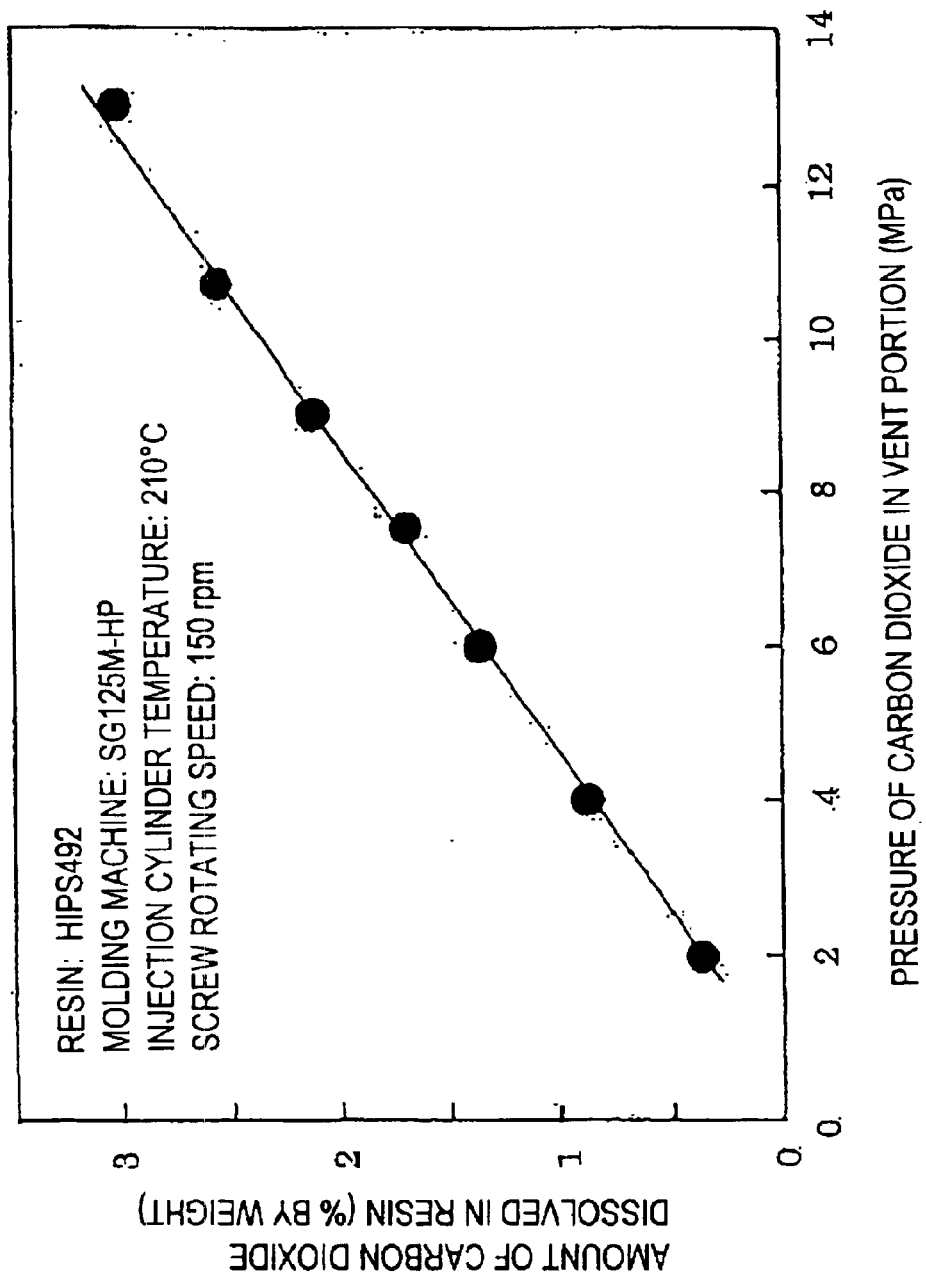
FIG. 1 is a diagram showing the relationship between the pressure at which carbon dioxide was injected into a thermoplastic resin from the vent portion and the amount of absorption of the carbon dioxide into the resin.

In the drawings, respective numerals represent the following: 1, injection molding machine; 2, injection cylinder; 3, mold; 4, mold clamping device; 5, carbon dioxide source; 6, carbon dioxide booster; 7, carbon dioxide pressure control; 8, hopper; 9, liquefied carbon dioxide container; 10, electromagnetic on-off valve; 11, liquefied carbon dioxide compressor; 12, electromagnetic on-off valve; 13, heater; 14, reducing valve; 15, main tank; 16, relief valve; 17, meter; 18, gas supply pipe; 19, electromagnetic on-off valve; 20, check valve; 21, relief valve; 22, valve open to the atmosphere; 23, screw; 23$a$, first stage of the screw; 23$b$, second stage of the screw; 24, nozzle portion; 25, resin metering device; 26, gas supply section; 27, gas supply channel; 28, flow control section; 33, back-flow preventing ring; 34, nozzle hole; 35, needle valve; 36, drive unit; 37, drive rod.

BEST MODE FOR CARRYING OUT THE INVENTION

The present invention is described in greater detail.

Specific examples of the resins to be used in the molding method of the invention include thermoplastic plastic materials such as polyethylene, polypropylene, poly(vinyl chloride), acrylic resins, styrene-based resins, poly(ethylene terephthalate), poly(butylene terephthalate), polyallylates, poly(phenylene ether), modified poly(phenylene ether) resins, wholly aromatic polyesters, polyacetals, polycarbonates, polyetherimide, polyethersulfone, polyamide-based resins, polysulfones, polyetheretherketone and polyetherketone, as well as blends of one or more of these species, which may also incorporate various fillers.

The above styrene-based resins include homopolymers and copolymers that comprise styrene as an essential ingredient, and polymer blends prepared from these polymers and other resins. Of these, polystyrene and ABS resin are preferred. The polystyrene includes a styrene homopolymer or a rubber-reinforced polystyrene having rubber distributed in the resin phase.

In the present invention, thermoplastic resins for which carbon dioxide has high plasticizing effect are preferred and, specifically, styrene-based resins, polycarbonates, poly (phenylene ether), modified poly(phenylene ether) resins, etc. are preferred. In particular, polycarbonates not only permit carbon dioxide to be dissolved in large amount, they also generate carbon dioxide when decomposed thermally; hence, the inclusion of carbon dioxide in the molten resin offers the added advantage of shifting the equilibrium of the decomposition reaction to slow down its rate, thus making polycarbonates optimum for the present invention.

The invention is suitable for the molding of various difficult-to-process resins such as thermoplastic resins that have too large molecular weights to be injection molded, resins that are so heat-labile as to readily undergo pyrolysis, resins that have high softening temperature and need be molded at very high temperature, and resins that incorporate special additives such as easily heat-decomposable flame retardants.

The invention is also suitable for the molding of other resins such as thermoplastic resins that can be used in general extrusion molding procedures but which do not have sufficient flowability to be injection molded and thermoplastic resins that have too large molecular weights to be injection molded. Examples of these resins include the following thermoplastic resins.

(1) Acrylic resins having melt flow rates of not more than 1.0, especially not more than 0.5;

(2) Polystyrenes having melt flow rates of not more than 1.5, especially not more than 1.0;

(3) Rubber-reinforced polystyrenes having melt flow rates of not more than 2.0, especially not more than 1.5;

(4) ABS resins having melt flow rates of not more than 3.0, especially not more than 2.5;

(5) Polycarbonates having melt flow rates of not more than 6.0, especially not more than 5.0;

(6) Poly(phenylene ether) or modified poly(phenylene ether) resins containing at least 60 wt %, especially at least 70 wt %, of poly(phenylene ether);

(7) Polyacetals having melt flow rates of not more than 5.0, especially not more than 3.0;

(8) Polyethylenes having melt flow rates of not more than 5.0, especially not more than 3.0;

(9) Polypropylenes having melt flow rates of not more than 5.0, especially not more than 3.0;

(10) Thermoplastic resins incorporating easily heat-decomposable flame retardants.

The melt flow rate values indicated here were obtained by measurement in accordance with the method described in JIS•K7210 and the conditions of measurement are those described in said JIS and which are commonly used for the respective resins; condition 15 was used in the measurement for acrylic resins, condition 8 for polystyrenes and rubber-reinforced polystyrenes, condition 11 for ABS resins, condition 20 for polycarbonates, condition 4 for polyacetals and polyethylenes, and condition 14 for polypropylenes. The unit is g/10 minutes.

Generally speaking, the higher the molecular weight of moldings, the better their resistance to chemicals and impact but on the other hand, their flowability during molding deteriorates to render injection molding difficult to perform. Extrusion molding does not require as high flowability as in injection molding, so it is generally performed with polymers of large molecular weights; the present invention permits the use of such high-molecular weight polymers that are used in extrusion molding but not used in injection molding.

Examples of the thermoplastic resins that have too high softening points to be injection molded include poly (phenylene ether) or modified poly(phenylene ether) resins in which poly(phenylene ether) is mixed with polystyrene or rubber-reinforced polystyrene in a weight ratio of from 100:0 to 60:40. Poly(phenylene ether) does not have good moldability and is generally used in combination with more than 40 wt % of polystyrene or rubber-reinforced polystyrene. However, according to the molding method of the invention, poly(phenylene ether) can even be used in combination with 40 wt % or less of rubber-reinforced polystyrene.

The present invention is also effective for resins having high softening point or low decomposition temperature which, if heated until the molten resin has sufficient flowability, either decomposes or deteriorates to undergo impaired physical properties and high flowability can be obtained with low resin temperature. Generally speaking, if the thermoplastic resin to be molded is an amorphous thermoplastic resin, molding can be performed at a melting temperature which is not more than 150° C. higher than the glass transition temperature of the carbon dioxide-free thermoplastic resin and in the case of a crystalline thermoplastic resin, it can be molded at a melting temperature which is not more than 100° C. higher than the melting point of the carbon dioxide-free thermoplastic resin.

The molding method of the invention is applicable to the molding of molded articles that are similar to common non-foamed molded articles and the effectiveness of the invention is noticeable in thin-walled molded articles, moldings of unequal section thickness having both a thick-walled portion and a thin-walled portion in one part, and moldings having large flow distance from the gate. In order to ensure that the effectiveness of the invention is noticeable, moldings of unequal section thickness are preferred that are not more than 2 mm thick in the thin-walled portion and which are at least twice as thick in the thick-walled portion as in the thin-walled portion and more preferred are moldings of unequal section thickness that are not more than 2 mm thick in the thin-walled portion and which are at least three times as thick in the thick-walled portion as in the thin-walled portion. The section thickness as mentioned here means the thickness of a plate or a ribbed portion and it means the diameter of a cylindrical part such as a boss.

Carbon dioxide is used in the invention as a substance that is incorporated in thermoplastic resins to work as a plasticizer to lower their melt viscosity. Carbon dioxide has many advantages such as high solubility in molten resin, no deterioration of the resin, mold and the constituent material of the molding machine, no hazard to the environment in which molding is performed, low cost, and rapid evaporation from the molded article after molding. It should be noted that in the invention, carbon dioxide may be used either alone or in combination with hydrocarbons of 1 to 5 carbon atoms and/or Freons prepared by replacing some of the hydrogen atoms in those hydrocarbons with fluorine, or liquids such as water and alcohols.

The amount of carbon dioxide in the molten resin with which the mold cavity is to be filled is difficult to measure directly, so in the invention, the difference between the weight of a molded article measured immediately after injection molding of a carbon dioxide containing resin and the weight of the molded article measured after leaving it to stand for 24 hours in the atmosphere, then for at least 24 hours in a vacuum dryer at a temperature about 30° C. lower than the glass transition temperature of the resin if it is an amorphous resin or the melting point of the resin if it is a crystalline resin, until the amount of the carbon dioxide contained in the molded article has leveled off as a result of dissipation is defined as the amount of the carbon dioxide in the molten resin injected into the mold cavity.

Carbon dioxide dissolves well in thermoplastic resins to become a good plasticizer that improves the flowability of the thermoplastic resins. In the invention, carbon dioxide is dissolved in an amount of at least 0.2 wt % in molten thermoplastic resins. In order to achieve marked improvement in flowability, at least 0.2 wt % of carbon dioxide is necessary and at least 0.3 wt % is preferred. There is no particular limitation on the maximum amount by which carbon dioxide can be dissolved; however, high gas pressure is needed in order to dissolve a large amount of carbon dioxide and an undue increase in the amount of dissolution simply reduces the effectiveness of carbon dioxide in improving the flowability of the resin; hence, a practical amount of carbon dioxide that may be dissolved is 10 wt % or less, more preferably 5 wt % or less.

The following are two preferred methods for dissolving carbon dioxide in thermoplastic resins.

In one method, a particulate or powdery resin is preliminarily placed in a carbon dioxide atmosphere and after allowing it to absorb carbon dioxide, the resin is fed into the molding machine. In this case, the amount of carbon dioxide absorption is determined by its pressure, the temperature of its atmosphere and the time of absorption. In this method, part of the carbon dioxide in the resin evaporates as it is heated during plasticization, so the amount of carbon dioxide in the molten resin is smaller than the preliminarily absorbed dose. Hence, it is desirable that the resin feed path such as the hopper in the molding machine is also held in a carbon dioxide atmosphere, optionally pressurized up to a value close to the pressure for absorption.

In the other method, carbon dioxide is dissolved in a resin as it is plasticized within the plasticizing cylinder in the molding machine or after it has been plasticized within the plasticizing cylinder; to this end, the area around the hopper in the molding machine is held in a carbon dioxide atmosphere or carbon dioxide is injected into the plasticizing cylinder. In the case where carbon dioxide is injected into the middle portion of the plasticizing cylinder, it is preferred to use a 2-stage vent-type screw, with gas being injected into the vent portion where the screw channel depth is great and the pressure of the molten resin is low. In addition, in order to have the injected carbon dioxide dissolved and dispersed uniformly in the molten resin, it is preferred to furnish the screw with a mixing mechanism such as a Dulmage torpedo or kneading pins or provide a static mixer in the resin channel. The injection molding machine to be used may be of the in-line screw type or the screw preplunger type and an injection molding machine of the screw preplunger type is particularly preferred since the screw design for the extruder where the resin is plasticized and the position where carbon dioxide is injected are easy to change.

The carbon dioxide in thermoplastic resins will gradually dissipate into the atmosphere if moldings are left to stand there after the thermoplastic resins have solidified. The dissipation will not cause any bubbles to form in the moldings and their performance after the dissipation is not at all different from the inherent performance of the initial thermoplastic resins.

The mold need not have any special structures but in order to facilitate the filling of the mold cavity with molten resin, the mold cavity is preferably provided with an adequate air venting structure in an area near the site where final filling with the molten resin is performed. Effective air venting structures are vent slits provided in the parting plane, the mating surface of inserts, and in the periphery of ejector pins or fixed pins, as well as the surface of the mold cavity that is made of a porous sintered metal.

FIG. 1 shows the relationship between the pressure at which carbon dioxide was injected into the vent portion in a resin starved state of a vent-type, intermittently rotating screw in an injection molding extruder and the amount of carbon dioxide dissolved in the resin. In FIG. 1, the amount of dissolved carbon dioxide is in proportion to the carbon dioxide pressure in the vent portion, showing that the amount of dissolved carbon dioxide can be controlled by said injection pressure. In the invention, the amount of carbon dioxide to be dissolved in the resin can be controlled by the carbon dioxide pressure in the vent portion.

Figure 2:
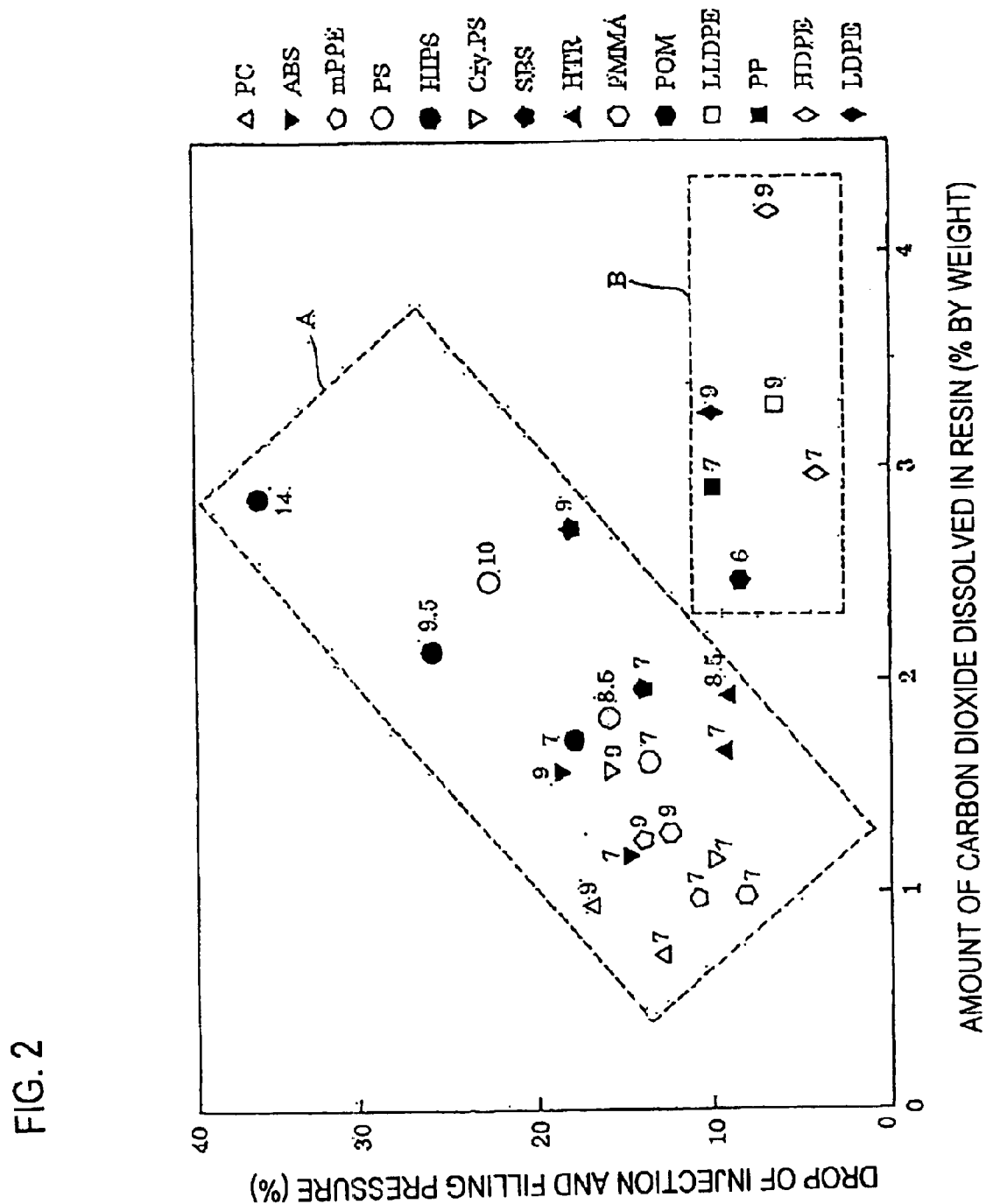
FIG. 2 is a diagram showing the relationship between the content of carbon dioxide in various injection-molded resins and the percent drop of injection pressure during injection molding.

FIG. 2 shows the relationship between the amount of dissolved carbon dioxide in various injection-molded resins and the percent drop of injection pressure during injection molding. The molding temperature of each was referenced to 120° C. above the glass transition temperature resin when it was an amorphous resin and 30° C. above melting point when it was a crystalline resin and adjustments were made within about ±20° C. depending upon the flowability and heat stability of each resin. The percent drop of injection pressure is the ratio of the injection pressure required to fill the mold cavity with a carbon dioxide containing resin as compared to the injection pressure required to fill the mold cavity with a carbon dioxide free resin; the greater the percent drop of injection pressure in the presence of carbon dioxide, the more effective it is in improving resin flowability. The present inventors found that the resins shown in FIG. 2 could be divided into two groups A and B, the former consisting of the resins experiencing large percent drops of injection pressure due to carbon dioxide and the latter consisting of the resins experiencing small percent drops of injection pressure. The numerals in the Figure indicate the pressure (MPa) at which carbon dioxide was injected into the vent portion.

Figure 3:
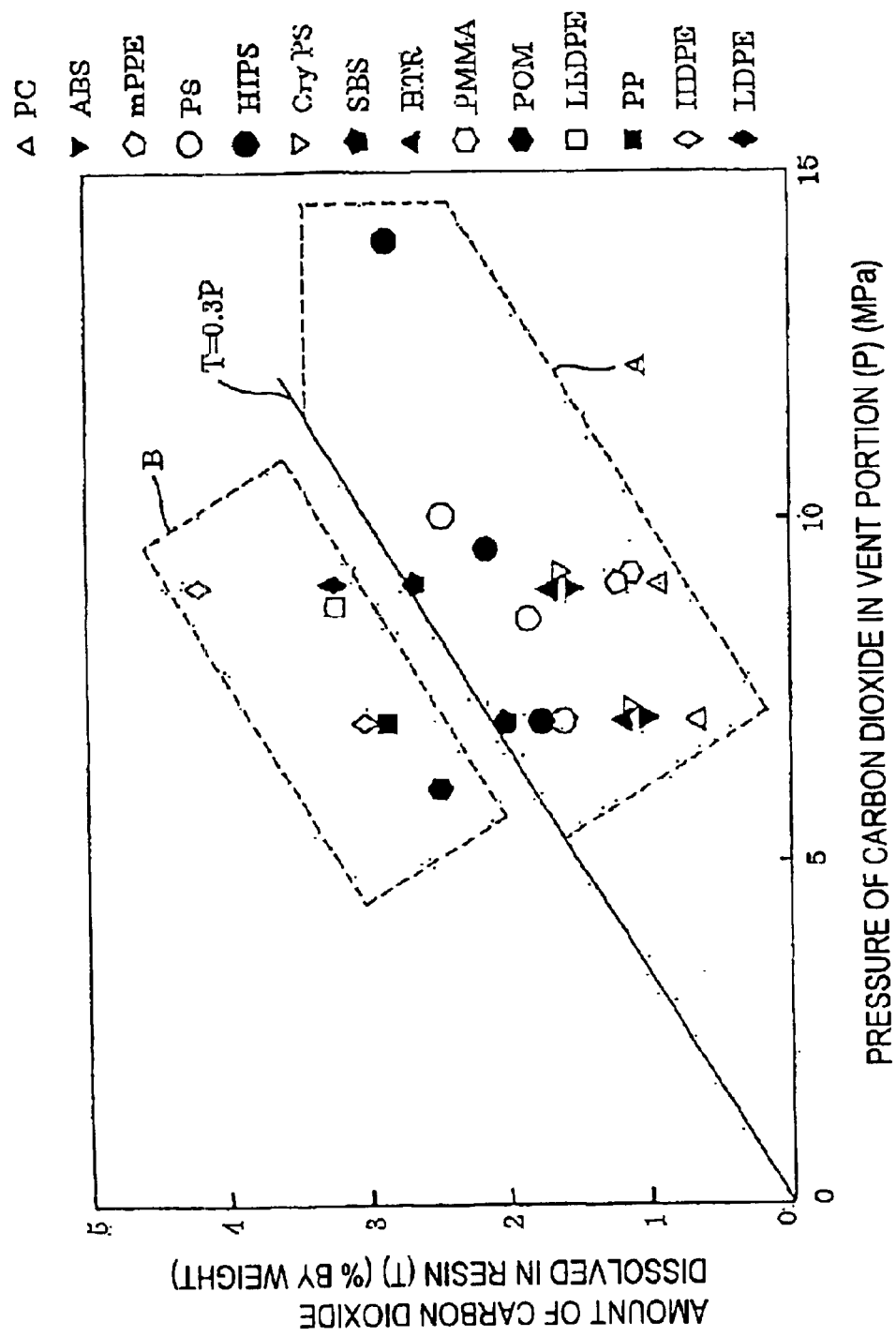
FIG. 3 is a diagram showing the relationship between the pressure at which carbon dioxide was injected into the vent portion and the content of carbon dioxide in various injection-molded resins.

FIG. 3 shows the relationship between the carbon dioxide pressure in the vent portion and the amount of dissolved carbon dioxide in various injection-molded resins. The solid line in FIG. 3 represents the case of T=0.3P where P is the carbon dioxide pressure (Pa) in the vent portion and T is the amount of dissolved carbon dioxide (wt %). As in FIG. 2, distinction can also be made in FIG. 3 between the resins of group A (T≦0.3P) and those of group B (T>0.3P). In other words, the resins of group A are within a region of low dissolution of carbon dioxide in molten resin and the resins of group B are within a region of high dissolution. The finding of this phenomenon is also a particular element on the basis of which the injection molding method of the invention has been accomplished and it is preferred to selectively use thermoplastic resins of group A in FIG. 3, namely, such resins that the amount of carbon dioxide to be dissolved in molten resin per carbon dioxide pressure at the molding temperature is not more than 0.3 wt %/MPa.

Here, the molding temperature of each resin varies somewhat depending on flowability or the like and the amount of dissolved carbon dioxide fluctuates with the resin temperature; however, as shown in FIGS. 2 and 3, crystalline polystyrene and amorphous polystyrene which are believed to be the same in a molten state have substantially the same tendency despite the temperature difference of about 50° C. and the difference in dissolution characteristics between groups A and B is by far greater than that caused by temperature fluctuations and there is no possibility that one resin shifts between groups A and B at practical molding temperatures.

The thermoplastic resins are either amorphous or crystalline and amorphous thermoplastic resins are generally low in flowability when molten and they have not been suitable for injection molding of thin-walled parts; on the other hand, they can be plasticized with great efficiency by dissolving carbon dioxide and they also meet the requirements of the invention to be usable with preference.

The invention can also be used with advantage as a molding method in which a first thermoplastic resin having at least 0.2 wt % of carbon dioxide dissolved therein and a second thermoplastic resin to be described later are filled into the mold cavity either consecutively or simultaneously. Useful with particular advantage is an injection molding method in which the mold cavity is filled with the first thermoplastic resin having at least 0.2 wt % of carbon dioxide dissolved therein and then packed with a second thermoplastic resin containing no carbon dioxide. The second thermoplastic resin may be exemplified by various cases such as where it is of the same kind as the first thermoplastic resin but has a different carbon dioxide content or a molecular weight, where it is of a different kind from the first thermoplastic resin, and where it is of a different kind from the first thermoplastic resin and also has a different carbon dioxide content; these cases can be combined as appropriate. By incorporating carbon dioxide in the first thermoplastic resin, its melt viscosity is lowered and one can obtain a composite injection-molded part consisting of a uniform surface layer of the first thermoplastic resin and an internal core of the second thermoplastic resin. If a thermoplastic resin improved in heat resistance, chemical resistance, physical properties and the like is used as the first thermoplastic resin, one can produce molded articles that are covered with the first thermoplastic resin which is improved in those aspects to exhibit better performance.

By incorporating at least 0.2 wt % of carbon dioxide in the thermoplastic resin to improve the flowability of the first thermoplastic resin, one can reduce the orientation of polymer chains in the molded article.

To be specific, thermoplastic resins in the process of injection molding generally experience a flow called "fountain flow" within the mold cavity. The injected thermoplastic resin contacts the wall surfaces of a cooled mold, whereupon a solidified layer forms at the interface and the later injected thermoplastic resin advances by flowing inside of the solidified layer. The shear rate is the highest in the interfacial portion between the solidified layer and the flowing inner layer and the orientation of polymer chains is the highest in this interfacial portion where the shear rate is the highest.

On the other hand, incorporating carbon dioxide improves the flowability of the first thermoplastic resin, thereby reducing the orientation of the above interfacial portion. As a result, the orientation of polymer chains can be reduced in the entire part of the molded article, leading to its improvements such as reduced birefringence and enhanced impact strength.

The molded articles that can be molded with advantage by the present invention are preferably various mechanistic parts that need not satisfy strict requirements for appearance and quality but which require high dimensional precision and high levels of various kinds of strength. Examples are injection molded thermoplastic resin parts including the chassis of low-current electric devices, electronic devices, office equipment, etc., various automotive parts and various daily necessities. In applications such as the thin-walled housings of electronic devices having thick-walled portions in limited areas, the present invention facilitates molding operations and one may anticipate to have various benefits such as lighter weight and greater latitude in product design. In addition, it becomes easy to mold parts of unequal section thickness from resins such as those containing flame retardants which are too heat labile to be molded at elevated resin temperatures.

In the next place, an injection molding apparatus suitable for implementing the invention is described with reference to FIGS. 4 and 5.

Figure 4:
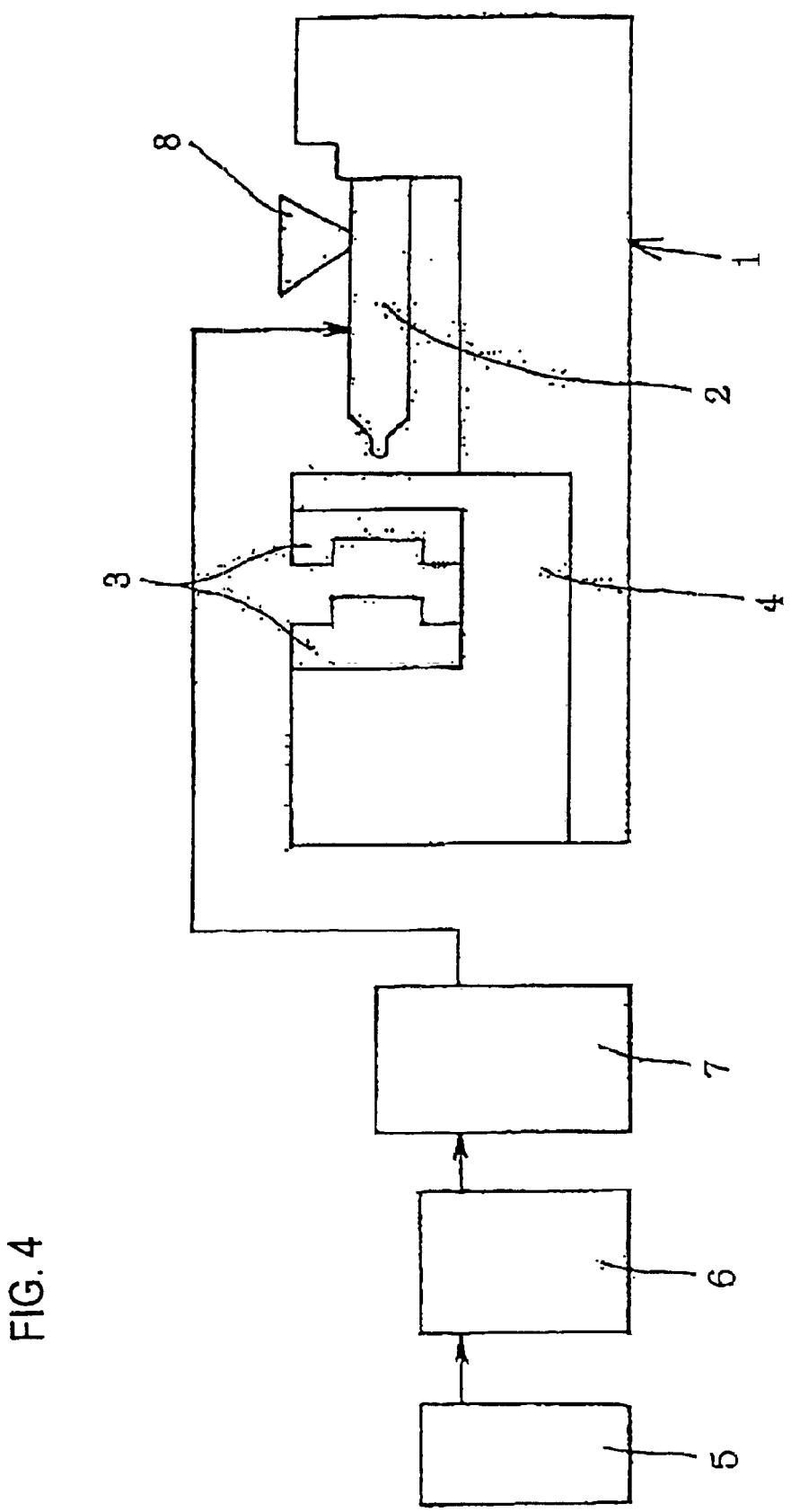
FIG. 4 is a schematic diagram of an injection molding apparatus suitable for the injection molding method of the invention.

In FIG. 4, numeral 1 designates an injection molding machine which is furnished with a plasticizing cylinder 2 which plasticizes and injects a thermoplastic resin, a mold 3 and a mold clamping device 4. The plasticizing cylinder 2 in the injection molding machine 1 is supplied with carbon dioxide from a carbon dioxide source 5 via a gas supply device comprising a carbon dioxide booster 6 and a carbon dioxide pressure control 7.

If desired, carbon dioxide may be supplied into a hopper 8 on the plasticizing cylinder 2 so that it is absorbed by a resin being supplied from the hopper 8 into the plasticizing cylinder 2. In this case, the carbon dioxide to be supplied into the injection cylinder 2 and the carbon dioxide to be supplied into the hopper 8 are preferably adapted to be controllable independently in such terms as the start and stop of supply and the supply pressure.

The above plasticizing cylinder 2, carbon dioxide source 5, carbon dioxide booster 6 and carbon dioxide pressure control 7 are further described with reference to FIG. 5.

Figure 5:
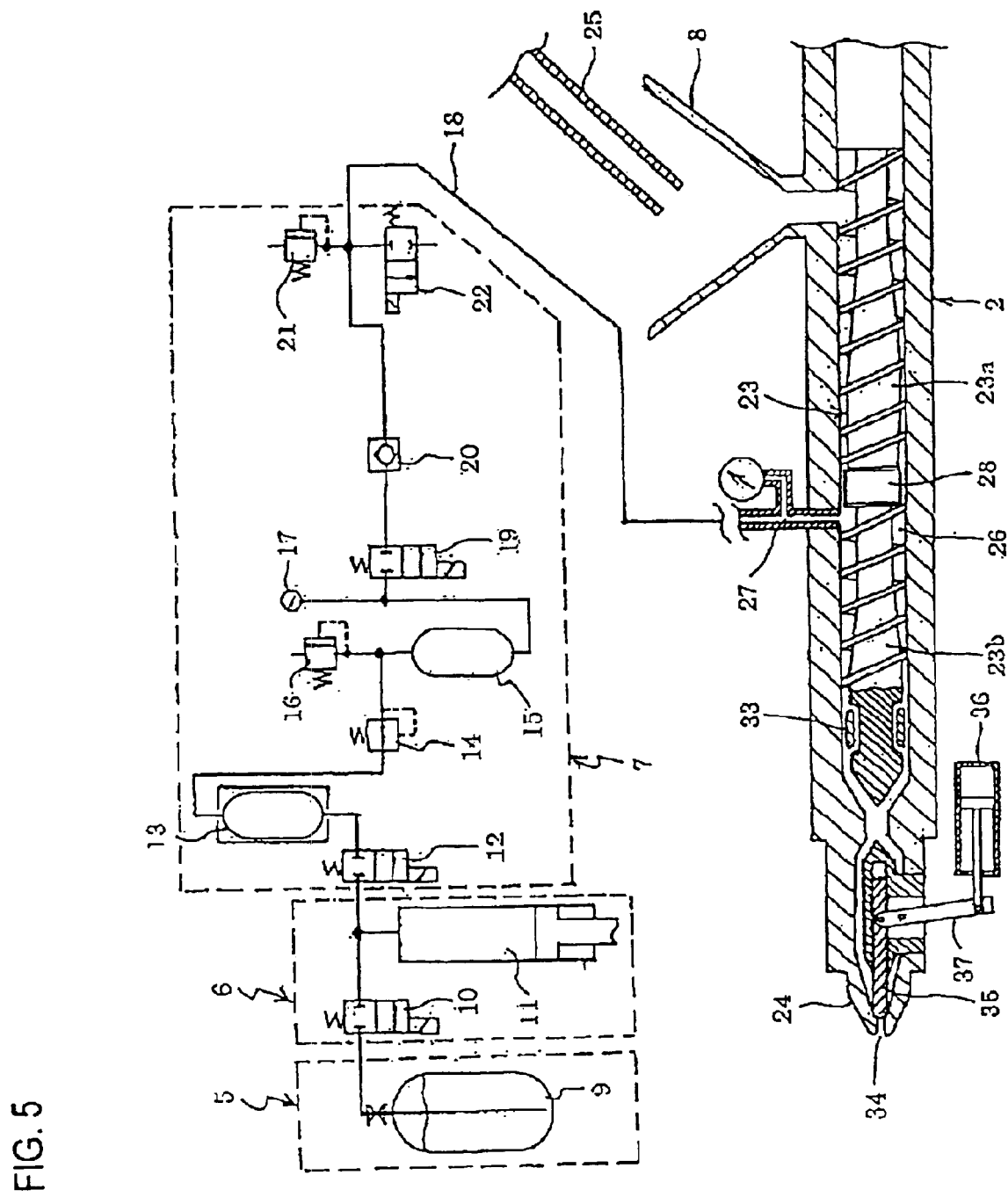
FIG. 5 is a diagram showing details of a gas supply device comprising a carbon dioxide source, a carbon dioxide booster and a carbon dioxide pressure control that are shown in FIG. 4 and a plasticizing cylinder portion.

As shown in FIG. 5, a liquefied carbon dioxide container 9 is used as the carbon dioxide source 5 in the case under consideration.

The carbon dioxide booster 6 is equipped with a liquefied carbon dioxide compressor 11 which pressurizes liquefied carbon dioxide to have an elevated pressure and the liquefied carbon dioxide container 9 is connected to the liquefied carbon dioxide compressor 11 via an electromagnetic on-off valve 10. The space between the carbon dioxide source 5 and the carbon dioxide booster 6 is held below the critical temperature of carbon dioxide (31.1° C.) in order to keep the carbon dioxide liquefied. The liquefied carbon dioxide supplied into the liquefied carbon dioxide compressor 11 from the liquefied carbon dioxide container 9 and which has been compressed there to have a higher pressure is sent to the carbon dioxide pressure control 7.

The liquefied carbon dioxide sent to the carbon dioxide pressure control 7 is supplied to a heater 13 via an electromagnetic on-off valve 12. The liquefied carbon dioxide supplied into the heater 13 is heated there to become a gas hotter than the critical temperature and the gas passes through a reducing valve 14 to be supplied into a main tank 15 for the plasticizing cylinder 2. The main tank 15 is connected to a relief valve 16 for escape of gas if the internal pressure becomes abnormally high and to a meter 17 for checking the gas pressure in the main tank 15.

The above main tank 15 and the plasticizing cylinder 2 are connected by a gas supply pipe 18 which are equipped, in order from the main tank 15, with an electromagnetic on-off valve 19 and a check valve 20. Connected between the check valve 20 and the plasticizing cylinder 2 are a relief valve 21 and a valve 22 open to the atmosphere.

We now describe the procedure of operating the above-described gas supply device to supply carbon dioxide into a gas supply section 26 in the plasticizing cylinder 2.

First, the electromagnetic on-off valve 10 is opened with the electromagnetic on-off valves 19 and 20 closed, whereupon liquefied carbon dioxide is supplied from the liquefied carbon dioxide container 9 into the liquefied carbon dioxide compressor 11. Upon opening the electromagnetic on-off valve 12, the liquefied carbon dioxide gas compressed in the liquefied carbon dioxide compressor 11 is supplied into the heater 13 and warmed, then its pressure is reduced to the necessary level by the reducing valve 12 before it is stored in the main tank 15. After the pressurized gas with the necessary pressure has been stored in the main tank 15, the electromagnetic on-off valve 19 is opened and a predetermined pressure of carbon dioxide is supplied into the plasticizing cylinder 2 via the gas supply pipe 18.

The plasticizing cylinder 2 is equipped with a 2-stage type screw 23 in which a stage comprising, in order from the resin supply section (hopper 8) toward the front end, a feed section, a compression section and a metering section is repeated twice in series and the first stage of the screw 23a is closer to the hopper 8 and the second stage of the screw 23b is closer to the nozzle portion 24.

A resin metering unit 25 is connected to the hopper 8 on the plasticizing cylinder 2 and a metered and controlled quantity of resin is supplied into the hopper 8. By connecting the resin metering unit 25 to the hopper 8, there is offered another advantage in that the amount of resin supply is controlled to provide greater ease with which the molten resin can be transferred in a starved state through the gas supply section 26. By the expression "the molten resin is transferred in a starved state", we mean that the molten resin being transferred does not completely fill the plasticizing cylinder 2 but leaves a partial empty space.

The gas supply section 26 is located in the feed section (vent portion) of the second stage of the screw 23b and a gas supply channel 27 is open to this gas supply section 26. The gas supply channel 27 is connected to the aforementioned gas supply pipe 18.

A flow control section 28 is provided between the gas supply section 26 and the first stage of the screw 23a. The flow control section 28 has a small clearance from the inner surface of the barrel of the plasticizing cylinder 2 and controls the amount of the molten resin being transferred from the first stage of the screw 23a to ensure that the molten resin is transferred in a starved state through the gas supply section 26 and that the carbon dioxide supplied into the gas supply section 26 will not flow backward to the hopper 8.

The clearance between the above flow control section 28 and the inner surface of the barrel of the plasticizing cylinder 2 is variable with the screw diameter but it is preferably about 0.1 to 1 mm, more preferably about 0.1 to 0.5 mm. The length of the flow control section 28 is preferably about 5 to 200% of the screw diameter, more preferably about 10 to 100% of the screw diameter.

The above clearance and the length are selected as appropriate for the melt viscosity of resin and the pressure of gas to be supplied. The lower the melt viscosity of the resin used and the higher the pressure of carbon dioxide to be supplied into the gas supply section 26, the smaller the clearance and the greater the length. By adjusting these values, if the first stage of the screw 23a is filled with the resin, the carbon dioxide in the gas supply section 26 can be positively prevented from flowing backward to the hopper 8 during the molding operation. If desired, the temperature of the molten resin passing through the flow control section 28 may be lowered to enhance its viscosity and this is also effective in ensuring that the carbon dioxide supplied into the gas supply section 26 will not flow backward to the hopper 8. In place of or in combination with the flow control section 28, a resin back-flow preventing ring commonly used at the front end of the screw may effectively be installed to prevent carbon dioxide from flowing backward to the hopper 8.

To supply carbon dioxide into the gas supply section 26, the molten resin is transferred in a starved state through the gas supply section 26 by means of the above flow control section 28 and the empty space thus formed in the gas supply section 26 (the area not filled with the molten resin) is supplied with carbon dioxide via the gas supply channel 27. By supplying carbon dioxide in this way, a gas space with a predetermined pressure can be formed in the gas supply section 26 and by bringing carbon dioxide into contact with the molten resin under the predetermined pressure, the amount of its dissolution can be controlled with greater ease.

The front end portion of the screw 23 is provided with a back-flow preventing mechanism 33 for preventing the molten resin from flowing backward when it is being injected. The nozzle portion 24 is also provided with a needle valve 35 for opening or closing a nozzle hole 34. This needle valve 35 is provided within the nozzle portion 24 in such a way that it can move toward or away from the nozzle hole 34. When a drive rod 37 is tilted by a drive unit 36 such as a hydraulic cylinder, the needle valve 35 is moved back and forth and it closes the nozzle hole 34 when it advances whereas it opens the nozzle hole 34 when it retracts.

Providing the needle valve 35 of the above type to ensure that the nozzle hole 34 can be opened and closed offers the advantage that if plasticizing and metering operations are performed by exerting pressure (back pressure of the screw) on the front end portion of the screw 23 with the nozzle hole 34 kept closed, the molten resin with dissolved carbon dioxide that collects in the front end portion of the injection cylinder 2 after metering can be prevented from foaming.

In the injection molding method of the invention, it is preferred to use the plasticizing cylinder 2 which is capable of opening and closing the nozzle hole 34; the mechanism for opening and closing the nozzle hole 34 is not limited to the above type which forces it to open and close mechanically and there may be used such a type that the nozzle hole 34 opens automatically when the pressure of the molten resin in the plasticizing cylinder 2, particularly the pressure of the molten resin at its front end, has reached a predetermined level. In other words, the injection molding machine 1 to be used in the invention preferably employs the plasticizing cylinder 2 equipped with a valve nozzle that can be opened or closed.

EXAMPLES

The following examples and comparative examples are provided for the purpose of further illustrating the present invention.

To begin with, the materials, the equipment and the method for measuring the quantity of carbon dioxide in molten resin that were used in the examples and comparative examples are described, together with the molding conditions.

Resins

"PANLITE L1225L", product of Teijin Chemicals Ltd. was used as a polycarbonate (PC); "STYLON 492", product of ASAHI KASEI CORP. was used as a rubber-reinforced polystyrene (HIPS); a blend of 80 wt % poly(phenylene ether) and 20 wt % polystyrene was used as a modified poly(phenylene ether) resin (mPPE). Each of these polymers was in the form of pellets before molding; the polycarbonate was used after being dried in a hot-air dryer at 120° C. for 5 hours.

Carbon Dioxide

Carbon dioxide with a purity of at least 99% was used.

Molding Machine

"SG125M-HP", product of SUMITOMO HEAVY INDUSTRIES, LTD. was used as a molding machine. The screw cylinder in the molding machine was of a vent type with L/P=23; the vent portion was adapted to be capable of being pressurized with carbon dioxide and the pressure of carbon dioxide being supplied was held constant by means of a reducing valve to control the amount of carbon dioxide to be dissolved in molten resin. Throughout the period from plasticization to the start of injection, a minimum pressure that would prevent the screw from retracting upon foaming of the plasticized resin was set as the back pressure of the screw. The vent portion was also designed such that the resin would be transferred through it in a starved state at all times.

Dissolving Carbon Dioxide in Molten Resins

Carbon dioxide was supplied at 10 MPa into the vent portion of the plasticizing cylinder so as to dissolve the carbon dioxide in the molten resin. When no carbon dioxide was to be dissolved in the molten resin, the vent portion of the plasticizing cylinder was connected to a vacuum pump.

Measuring the Amount of Carbon Dioxide in Molten Resins

The amount of carbon dioxide dissolved in molten resin was measured from the decrease in the weight of a molded article after molding. Specifically, the weight of a molded article was measured immediately after molding; thereafter, the molded article was left to stand in the atmosphere for about 24 hours, then for at least 24 hours in a vacuum dryer at a temperature about 30° C. lower than either the glass transition temperature of the resin when it was an amorphous resin or the melting point of the resin when it was a crystalline resin, until the amount of the carbon dioxide contained in the molded article leveled off as a result of dissipation; the difference between the two weights was defined as the amount of the carbon dioxide contained in the molten resin. The temperature setting for the interior of the vacuum dryer was 110° C. for the polycarbonate, 80° C. for the rubber-reinforced polystyrene and 150° C. for the modified poly(phenylene ether) resin.

Setting the Plasticizing Cylinder Temperature

The temperature setting of the plasticizing cylinder during injection molding was 280° C. for the polycarbonate, 200° C. for the rubber-reinforced polystyrene and 310° C. for the modified poly(phenylene ether) resin.

Mold

Moldings were each a rectangular flat sheet 2 mm thick, 120 mm long and 60 mm wide; they had a round center hole 10 mm in diameter and in the area near the terminal end of resin filling, a rib 3 mm in both width and height and 20 mm long was formed. The surface of the fixed part of the mold was satinized to a surface roughness (Ra) of 5 $\mu$m. The gate was 3 mm wide and 2 mm thick and the land length was 3 mm. The runner had a generally square cross section that was 4 mm wide and 4 mm deep on the average; the runner length was 140 mm. The sprue was 4 mm across and 55 mm long on the average. The nozzle touch portion had a diameter of 3.5 mm.

Atmosphere within the Mold Cavity

The mold cavity was filled with air at atmospheric pressure. During the filling with molten resin, the gas within the mold cavity was releasable from the parting plane of the mold.

Example 1

The polycarbonate as a resin feed was plasticized in the plasticizing cylinder as it was supplied with carbon dioxide, whereby carbon dioxide was dissolved in the molten resin.

For this molten resin, the resin pressure within the plasticizing cylinder that was necessary for resin filling was measured at a mold surface temperature of 80° C. Given a filling time of 0.6 seconds, the required filling pressure was 220 MPa. The resin filling was followed by 3-second dwelling at a pressure of 190 MPa within the plasticizing cylinder and, after 20-second cooling, the molded article was removed and examined with the naked eye.

The molded article had swirl marks on the surface but no sink marks were found on the side opposite the rib, nor was found any warpage. A cross section of the molded article was also examined and no bubbles were found.

Example 2

As in Example 1, the resin pressure within the plasticizing cylinder that was necessary for resin filling was measured for the rubber-reinforced polystyrene at a mold surface temperature of 40° C.; the required filling pressure was 150 MPa. The resin filling was followed by 3-second dwelling at a pressure of 120 MPa within the plasticizing cylinder and, after 20-second cooling, the molded article was removed and examined with the naked eye.

The molded article had swirl marks on the surface but no sink marks were found on the side opposite the rib, nor was found any warpage. A cross-sectional examination showed no presence of bubbles.

Example 3

As in Example 1, the resin pressure within the plasticizing cylinder that was necessary for resin filling was measured for the modified poly(phenylene ether) resin at a mold surface temperature of 90° C.; the required filling pressure was 210 MPa. The resin filling was followed by 3-second dwelling at a pressure of 180 MPa within the plasticizing cylinder and, after 20-second cooling, the molded article was removed and examined with the naked eye.

The molded article had swirl marks on the surface but no sink marks were found on the side opposite the rib, nor was found any warpage. A cross-sectional examination showed no presence of bubbles.

Comparative Example 1

The resin pressure within the plasticizing cylinder that was necessary for resin filling was measured for the polycarbonate as in Example 1 except that carbon dioxide was not absorbed. Even when the pressure within the plasticizing cylinder was increased up to 280 MPa which was the maximum capacity of the molding machine, it was impossible to accomplish filling within the same period of time as in Example 1 and although resin filling was performed for 2 to 3 seconds, only a short shot was injected and the resulting molded article was left unfilled in the final filling part of the sheet.

Comparative Example 2

The resin pressure within the plasticizing cylinder that was necessary for resin filling was measured for the rubber-reinforced polystyrene as in Example 2 except that carbon dioxide was not absorbed. Given a resin filling time of 0.6 seconds, the required filling pressure was 240 MPa. The resin filling was followed by 3-second dwelling at a pressure of 120 MPa within the plasticizing cylinder and, after 20-second cooling, the molded article was removed and examined with the naked eye.

The molded article had large sink marks on the side opposite the rib.

Comparative Example 3

The resin pressure within the plasticizing cylinder that was necessary for resin filling was measured for the modified poly(phenylene ether) resin as in Example 3 except that carbon dioxide was not absorbed. Even when the pressure within the plasticizing cylinder was increased up to 280 MPa which was the maximum capacity of the molding machine, it was impossible to accomplish filling within the same period of time as in Example 3 and although resin filling was performed for 2 to 3 seconds, only a short shot was injected and the resulting molded article was left unfilled in the final filling part of the sheet.

Comparative Example 4

The rubber-reinforced polystyrene was allowed to absorb carbon dioxide by supplying the vent portion of the injection cylinder with carbon dioxide at 0.5 MPa and the resin pressure within the plasticizing cylinder that was necessary for resin filling was measured as in Example 2. Given a resin filling time of 0.6 seconds, the required filling pressure was 235 MPa. The resin filling was followed by 3-second dwelling at a pressure of 205 MPa within the plasticizing cylinder and, after 20-second cooling, the molded article was removed and examined with the naked eye.

The molded article had large sink marks on the side opposite the rib.

TABLE 1

(Filling time: 0.6 seconds)

| | Resin | Mold temperature (° C.) | $CO_2$ supply pressure (MPa) | $CO_2$ content in molten resin (wt %) | Required resin filling pressure (MPa) |
|---|---|---|---|---|---|
| Ex. 1 | PC | 80 | 10 | 1.2 | 220 |
| Ex. 2 | HIPS | 40 | 10 | 2.5 | 150 |
| Ex. 3 | mPPE | 90 | 10 | 1.5 | 210 |
| Com. Ex. 1 | PC | 80 | 0 | 0 | ≧280 * |
| Com. Ex. 2 | HIPS | 40 | 0 | 0 | 240 |
| Com. Ex. 3 | mPPE | 90 | 0 | 0 | ≧280 * |
| Com. Ex. 4 | HIPS | 40 | 0.5 | 0.1 | 235 |

* Filling was impossible at 280 MPa and only a short shot resulted.

The methods of measurements for FIGS. 1 to 3 are described below.

Resins and Injection Cylinder Temperature

Polycarbonate resin (PC, "PANLITE L1225L", product of Teijin Chemicals Ltd.; 300° C.)

Polystyrene resin (PS, "A&M POLYSTYRENE 685", product of A&M Styrene Co.; 220° C.)

Rubber-reinforced polystyrene (HIPS, "A&M POLYSTYRENE 492", product of A&M Styrene Co.; 210° C.)

Modified poly(phenylene ether) (mPPE, "XYRON X9108", product of ASAHI KASEI CORP.; 320° C.)

Crystalline polystyrene (Cry.PS, "ZALEC", product of Idemitsu Petro-Chemical Co., Ltd.; 280° C.)

Acrylonitrile-butadiene-styrene resin (ABS, "STYLAC ABS 183", product of ASAHI KASEI CORP.; 230° C.)

Styrene-butadiene block polymer (SBS, "ASAFLEX 835", product of ASAHI KASEI CORP.; 200° C.

Poly(methyl methacrylate) resin (PMMA, "DELPET 80N", product of ASAHI KASEI CORP.; 240° C.

Hydrogenated styrene-butadiene block polymer (HTR, "TAFTEC 1041", product of ASAHI KASEI CORP.; 230° C.)

Polyacetal resin (POM, "TENAC 3510", product of ASAHI KASEI CORP.; 190° C.)

Low-density polyethylene (LDPE, "SUNTEC-LD M1703", product of ASAHI KASEI CORP.; 200° C.)

Linear low-density polyethylene (LLDPE, "G5361", product of Nippon Unikar Co., Ltd.; 180° C.)

High-density polyethylene (HDPE, "SUNTEC-HD J240", product of ASAHI KASEI CORP.; 210° C.)

Polypropylene (PP, "BJ6H", product of Mitsui Chemicals, Inc.; 170° C.)

Dissolving Carbon Dioxide in Molten Resins

Carbon dioxide was supplied at a pressure of 6 to 14 MPa into the vent portion of the molding machine so as to dissolve the carbon dioxide in the resins.

Measuring the Amount of Carbon Dioxide Dissolved in Plasticized Resins

The amount of carbon dioxide dissolved in a resin was measured from the decrease in the weight of a molded article after molding. Specifically, the weight of a molded article was measured immediately after molding; thereafter, the molded article was left to stand in the atmosphere for about 24 hours, then for at least 24 hours in a vacuum dryer at a temperature about 30° C. lower than either the glass transition temperature of the resin when it was an amorphous resin or the melting point of the resin when it was a crystalline resin, until the amount of the carbon dioxide contained in the molded article leveled off as a result of dissipation; the difference between the two weights was defined as the amount of the carbon dioxide contained in the molten resin.

Mold

Moldings were each a rectangular flat sheet 2 mm thick, 120 mm long and 60 mm wide. The gate was 3 mm wide and 2 mm thick and the land length was 3 mm. The runner had a generally square cross section that was 4 mm wide and 4 mm deep on the average; the runner length was 140 mm. The sprue was 4 mm across and 55 mm long on the average. The nozzle touch portion had a diameter of 3.5 mm. The mold temperature was 40° C. for the polyolefinic resins such as PE and PP, 60° C. for the styrene-based resins such as PS and ABS, and 80° C. for the engineering resins such as PC, PPE and POM.

Measuring the Resin Filling Pressure

The various resins were injection molded with carbon dioxide being supplied from the injection cylinder and the resin pressure in the cylinder of the molding machine required to give a full shot in the mold cavity was measured to determine the relationship between the amount of dissolved carbon dioxide and its effectiveness in improving flowability.

INDUSTRIAL APPLICABILITY

According to the present invention, high-molecular weight resins and other resins that have been difficult to mold in spite of their outstanding physical properties, as well as flame retardant-containing resins that are too heat labile to be molded at elevated resin temperatures can be shaped with ease. Therefore, the parts that need not satisfy strict requirements for appearance and quality benefit from the increase in the number of resin choices for the parts design and from the greater latitude in the choice of candidate materials for the development of resins. Even in the case of using conventional resins, better quality of molded articles and greater latitude in product design can be anticipated in applications that require high enough resin flowability such as thin-walled parts, parts of high length-to-breadth ratio and parts of unequal section thickness.

What is claimed is:

1. A method of injection molding of a thermoplastic resin, comprising:
    filling a mold cavity with a molten resin that preliminarily contains at least 0.2 wt % and not more than 10 wt % of carbon dioxide dissolved therein to lower its melt viscosity, while allowing the molten resin to foam at the flow front thereof; and then
    pressurizing the resin in the mold cavity to at least a pressure at which the resin does not foam;

wherein a thermoplastic resin having an amount of carbon dioxide dissolved in its molten resin at the molding temperature, when carbon dioxide is supplied from a plasticizing cylinder of an injection molding machine to be dissolved in the molten resin, of not more than 0.3 wt %/MPa with respect to the pressure of the supplied carbon dioxide is used.

2. The method of injection molding of a thermoplastic resin as recited in claim 1, wherein the thermoplastic resin is selected from the group consisting of polycarbonate resin, polystyrene resin, rubber-reinforced polystyrene, modified poly (phenylene ether), crystalline polystyrene, acrylonitrile-butadiene-styrene resin, styrene-butadiene block polymer, poly (methyl methacrylate) resin, and hydrogenated styrene-butadiene block polymer.

* * * * *